United States Patent
Dong et al.

(10) Patent No.: US 7,412,556 B2
(45) Date of Patent: Aug. 12, 2008

(54) METHOD AND SYSTEM FOR MASTER DEVICES ACCESSING SLAVE DEVICES

(75) Inventors: Xin Dong, Beijing (CN); Chuanen Jin, Beijing (CN); Qingyun Cheng, Shanghai (CN); Gongcheng Li, Beijing (CN); Zhonghan Deng, Beijing (CN)

(73) Assignee: Vimicro Corporation, Beijing (CN)

( * ) Notice: Subject to any disclaimer, the term of this patent is extended or adjusted under 35 U.S.C. 154(b) by 165 days.

(21) Appl. No.: 11/262,154

(22) Filed: Oct. 28, 2005

(65) Prior Publication Data

US 2006/0149875 A1   Jul. 6, 2006

(51) Int. Cl.
- *G06F 13/00* (2006.01)
- *G06F 13/36* (2006.01)
- *G06F 13/16* (2006.01)
- *G06F 13/40* (2006.01)

(52) U.S. Cl. .................. 710/316; 710/110; 710/113
(58) Field of Classification Search .................. 710/317
See application file for complete search history.

(56) References Cited

U.S. PATENT DOCUMENTS

| | | | | |
|---|---|---|---|---|
| 5,699,533 A | * | 12/1997 | Sakai | 710/316 |
| 5,862,353 A | * | 1/1999 | Revilla et al. | 710/107 |
| 6,081,860 A | * | 6/2000 | Bridges et al. | 710/110 |
| 6,587,905 B1 | * | 7/2003 | Correale et al. | 710/107 |
| 6,658,511 B2 | * | 12/2003 | Yamada et al. | 710/107 |
| 6,691,193 B1 | * | 2/2004 | Wang et al. | 710/200 |
| 6,823,411 B2 | * | 11/2004 | Hofmann et al. | 710/110 |
| 6,883,051 B2 | * | 4/2005 | Wang et al. | 710/110 |
| 6,985,972 B2 | * | 1/2006 | Dieffenderfer et al. | 710/22 |
| 7,035,958 B2 | * | 4/2006 | Augsburg et al. | 710/310 |
| 7,219,178 B2 | * | 5/2007 | Harris et al. | 710/110 |
| 7,225,281 B2 | * | 5/2007 | Rosenbluth et al. | 710/104 |
| 7,234,011 B2 | * | 6/2007 | Chae | 710/110 |
| 2003/0145144 A1 | * | 7/2003 | Hofmann et al. | 710/110 |
| 2003/0221030 A1 | * | 11/2003 | Pontius et al. | 710/107 |
| 2004/0098525 A1 | * | 5/2004 | Wang et al. | 710/110 |

* cited by examiner

*Primary Examiner*—Paul R. Myers
*Assistant Examiner*—Ryan M Stiglic
(74) *Attorney, Agent, or Firm*—Joe Zheng

(57) ABSTRACT

Techniques for multiple master devices accessing one or more slave devices via a single data bus are disclosed. According to one aspect of the techniques, a bus controller coupled between the master devices and the slave device, wherein the bus controller is configured to receive bus signals from the master devices, select one of the bus signals from one of the master devices and forwards the selected bus signal to the slave device. After the slave device receives the bus signal from the one of the master devices, the slave device sends a bus response signal to the master devices over the bus controller, and the master device from which the bus signal is selected identifies and receives the bus response signal.

11 Claims, 6 Drawing Sheets

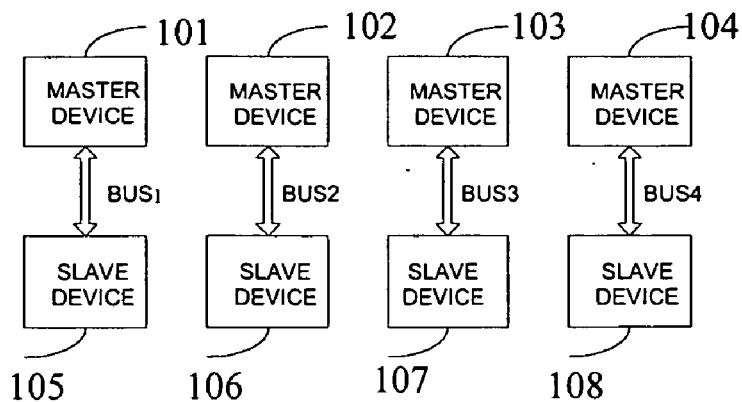
*(Prior Art)* FIG. 1
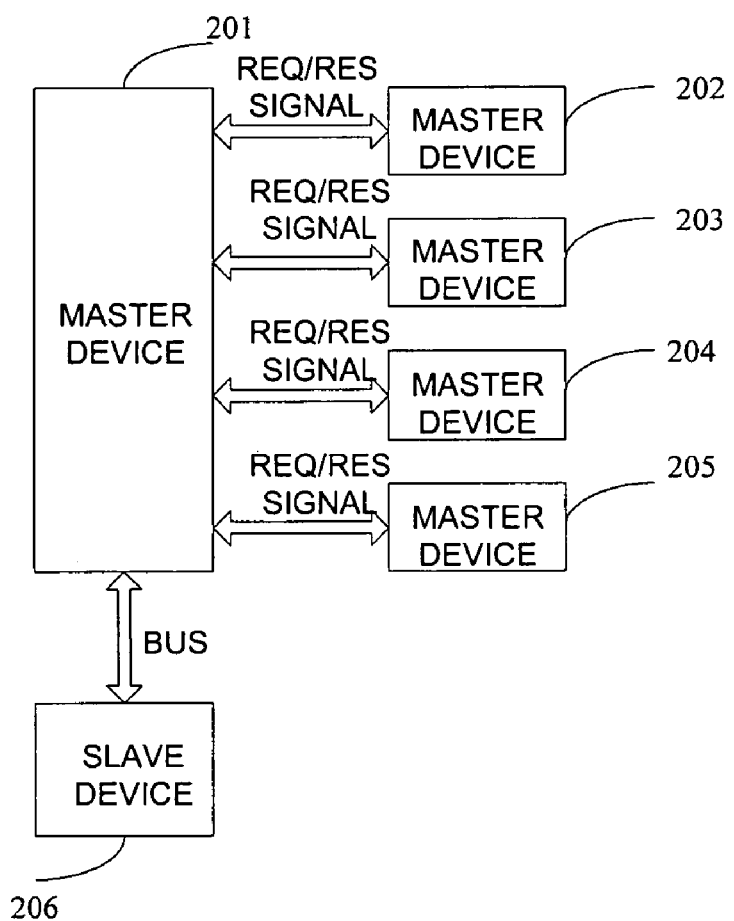
*(Prior Art)* FIG. 2

METHOD AND SYSTEM FOR MASTER DEVICES ACCESSING SLAVE DEVICES

BACKGROUND OF THE INVENTION

1. Field of the Invention

The present invention relates to the area of data communication, and more particularly to method and system for multiple master devices to access slave devices via a data bus (e.g., a unibus).

2. Description of Related Art

In data communications, most bus architectures are that one master device connects to one or more slave devices, in which the master device has complete control power over the bus, a slave device occupies the bus only when required by the master device and carries out data communication with the master device. If there are many master devices in one system (for example, a computer with multiple CPUs) and one slave device has to communicate with one or more master devices, the operation can be logically confused if not properly implemented.

In order to alleviate the problem, a conventional system is shown in FIG. 1 in which the system includes four master devices 101-104, four slave devices 105-108. Each of the master devices 101-104 communicates with one of the slave device 105-108 through a respective bus (e.g., bus1, bus2, bus3, or bus4). Each of the master devices 101-104 and each of the slave devices 105-108 are corresponding to each other, and each bus is corresponding to a pair of master device and slave device. Thus it guarantees no conflict among the buses by adopting this configuration, but it occupies more buses which lead to the waste of system resources.

In order to reduce the waste caused by buses, another conventional system is shown in FIG. 2, which includes five master devices 201-205, one slave device 206. In other words, the master device 201 serves as an occupant of the bus. When one of the master devices 202-205 needs to use the bus, it has to send a request to the master device 201. When the master device 201 detects that the bus is idle, it immediately sends confirmation signals to the requesting master device that has asked for the bus, then the requesting master device can communicate with slave device 206 via the master device 201 over the bus. This configuration reduces the waste of the bus, but it needs to add one more master device to serve as a management device of the bus, and the master device includes at least one chip such as a processor which increases the costs of the entire system.

Thus there is a need for techniques for multiple master devices that may access one or more slave device via a single data bus.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to multiple master devices accessing one or more slave devices via a single data bus. According to one aspect of the present invention, a bus controller is provided between the master devices and the slave device. The bus controller is configured to receive bus signals from the master devices, select one of the bus signals from one of the master devices and forwards the selected bus signal to the slave device. After the slave device receives the bus signal from the one of the master devices, the slave device sends a bus response signal to the master devices over the bus controller, and the master device from which the bus signal is selected identifies and receives the bus response signal.

To facilitate the distinctions among the bus signals from the master devices, each of the bus signals includes an identifier identifying one of the master devices. A response provided by the slave device in responding to the each of the bus signals includes similar identification information in accordance with the identifier such that the one of the master devices can acknowledge that the response from the slave device is for the one of the master devices although all of the master devices receives the response.

The present invention may be implements in many forms including a method, a system, part of device. According to one embodiment, the present invention is a system comprising: a plurality of master devices, a slave device, and a bus controller coupled between the master devices and the slave device, wherein the bus controller is configured to receive bus signals from the master devices, select one of the bus signals from one of the master devices and forwards the selected bus signal to the slave device, after the slave device receives the bus signal from the one of the master devices, the slave device sends a bus response signal to the master devices over the bus controller, and the master device from which the bus signal is selected identifies and receives the bus response signal.

One of the objects, features, and advantages of the present invention is to provide techniques for multiple master devices accessing one or more slave devices via a single data bus.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 is a schematic diagram of an conventional system including plural master devices and plural slave devices;

FIG. 2 is a schematic diagram of an conventional system including plural master devices and a slave device;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 3:
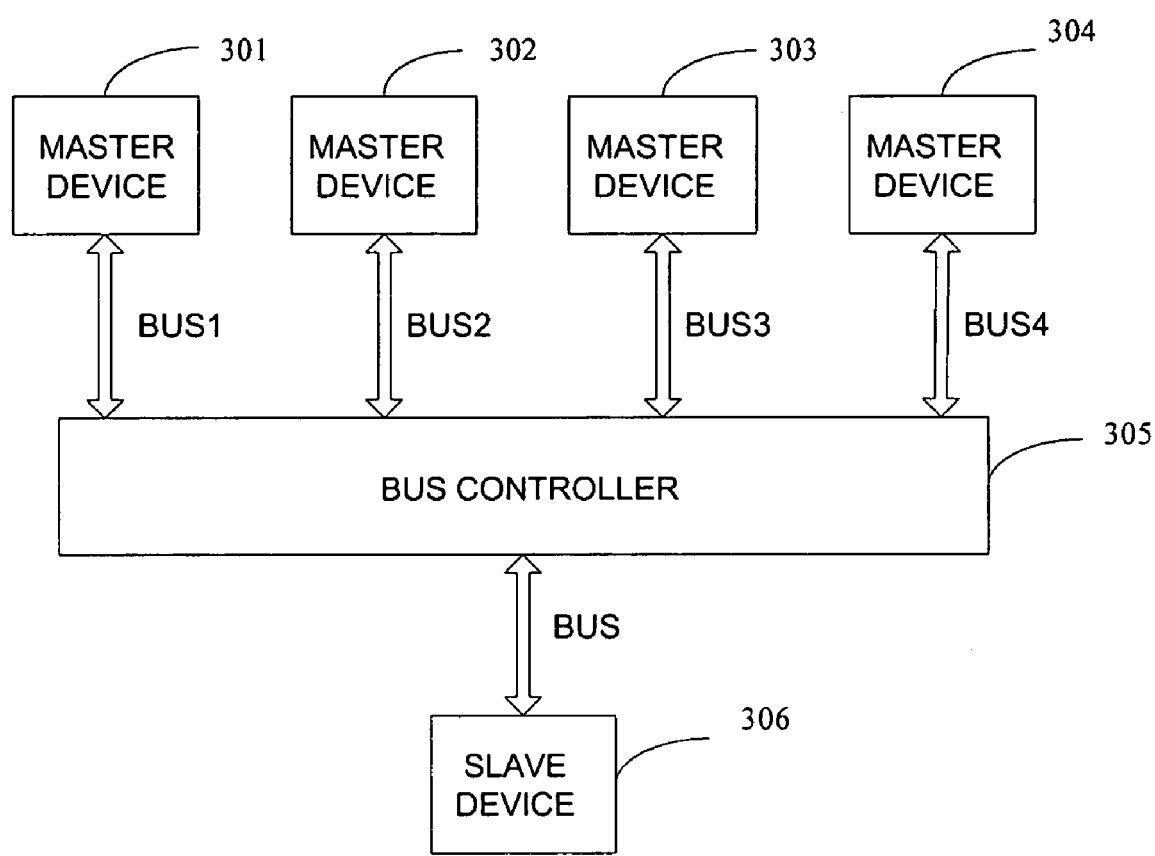
FIG. 3 is a schematic diagram showing a general structure of a system provided in the present invention.

Referring now to the drawings, in which like numerals refer to like parts throughout the several views. FIG. 3 shows an exemplary configuration in which the present invention may be practiced. The system shown in FIG. 3 includes a plurality of master devices (only four master devices 301-304 are illustrated for simplicity to explanation, at least one slave device 306 and a bus controller 305.

The bus controller 305 is provided to manage the operation of the bus to the slave device 306. For example, the bus controller 305 receives bus signals transmitted from the master devices 301-304 over corresponding buses, selects the bus signal transmitted from one of the master devices 301-304 and forwards the selected bus signal to the slave device 306. The bus signal from each master device includes at least some or all of a control bus signal, an address bus signal and data bus signal When the slave device 306 receives the bus signals from the master devices 301-304, the slave device 306 will respond to the bus signals from the master devices 301-304 over the bus controller 305, respectively. When a master device is selected, the bus controller 305 identifies its bus signal and manages communication between the selected master device and the slave device 306.

Depending on implementation, the identification of a master device may be realized in different ways. For example, a piece of identification information is included in the signal from each of the master device 301-304. Upon receiving the signal, the slave device 306 adds similar identification information into a bus signal responding to the signal from the master device. When all master devices receive the bus response signals, respectively, each is configured to determine if the bus response signal is sent thereto according the identification information. If so, the master device and the slave device 306 will routinely acknowledge each other in reference to the response signal.

Figure 4:
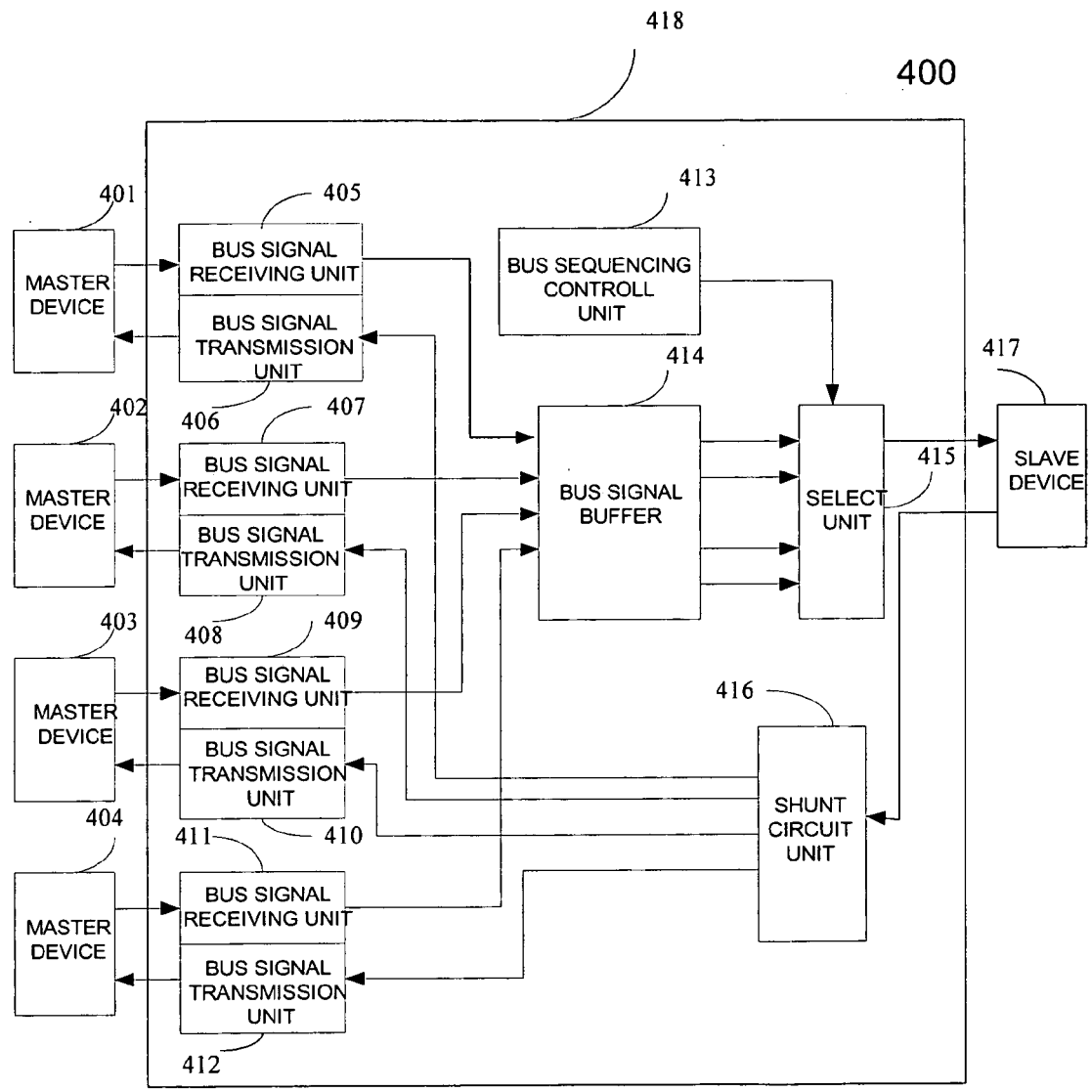
FIG. 4 is a first embodiment of the system according to the present invention.

Referring now to FIG. 4, there shows a function block diagram 400 of a bus controller in accordance with one embodiment of the present invention. The system 400 illustrated in FIG. 4 includes four master devices 401-404, a bus controller 418 and a slave device 417. The bus controller 418 includes four bus signal receiving units 405, 407, 409, and 411, each corresponding to one of the master devices 401-404, and four bus signal transmission units 406, 408, 410, 412, each corresponding to one of the master devices 401-404. The bus controller 418 further includes a bus sequencing control unit 413, a bus signal buffer 414, a select unit 415 and a shunt circuit unit 416.

In operation, a bus signal from the master device 401 is transmitted to the bus signal buffer 414 via the bus signal receiving unit 405. The bus signal of the master device 402 is transmitted to the bus signal buffer 414 via the bus receiving unit 407. The bus signal of the master device 403 is transmitted to the bus signal buffer 414 via the bus receiving unit 409. The bus signal of the master device 404 is transmitted to the bus signal buffer 414 via the bus receiving unit 411. After storing the bus signals from the master devices, the bus signal buffer 414 respectively transmits them to the select unit 415.

The bus sequencing control unit 413 controls the select unit 415 to select one of the bus signals from the master devices and transmit it to the slave device 417. The bus sequencing control unit 413 (controlled by a CPU or a single-chip microcomputer) can optionally select the master devices to communicate with the slave devices according to a number of means, for example, based on signal first-in first-out, signal last-in first-out or presetting signal output sequencing.

In operation, the signal first-in first-out approach is that within presetting time span, the master device 401 accesses (reading or writing) the slave device 417 first, while the master device 402 accesses the slave device 417 later. Accordingly, the bus sequencing control units 414 selects the master device 401 to communicate with the slave device 417 first. After the communication is complete, the bus sequencing control units 414 then selects the master device 402 to communicate with the slave device 417. The signal last-in first-out approach is operationally opposite to that of the signal first-in first-out. The presetting signal output sequencing is to conduct the sequencing priority to the master devices in advance. If the bus signal buffer 414 receives the bus signals from the multiple master devices at the same time, the bus signal from the mater device of which the sequencing priority is highest communicates with the slave device first. It should be noted that there are many sequencing methods which can be used independently or jointly.

The bus response signals, which include at least some or all of a data bus signal and an identification signal, from the slave device 417 is transmitted to and shunted by the signal shunt circuit unit 416 which may be realized by a digital logic circuit or selector chip. The shunted bus response signals are transmitted to the master devices 401-404 respectively via the corresponding bus signal transmission units 406, 408, 410 and 412. The master device, which its transmitted signal was selected, identifies the bus response signals according to the identification signal and receives the bus response signal.

Figure 5:
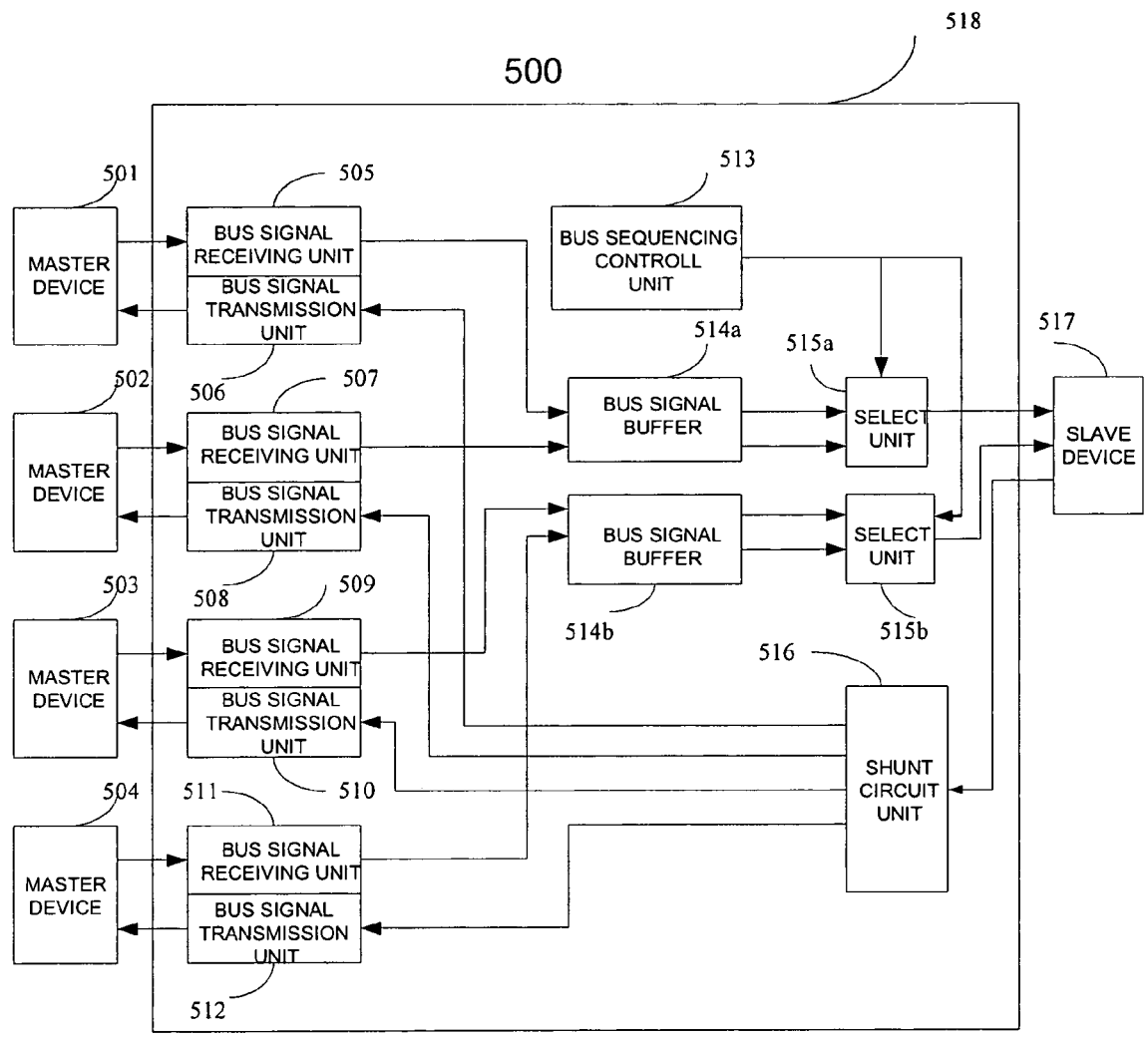
FIG. 5 is a second embodiment of the system according to the present invention.

Referring now to FIG. 5, there shows a function block diagram 500 of a bus controller in accordance with one embodiment of the present invention. The system 400 illustrated in FIG. 5 includes plural master devices 501-504, a bus control device 518 and a slave device 517. The bus controller 518 includes plural bus signal receiving units 505, 507, 509, and 511 corresponding respectively to the master devices 501-504, and bus signal transmission units 506, 508, 510, and 512, that further correspond respectively to the master devices 501-504. The system 400 further includes a bus sequencing control unit 513, bus signal buffers 514a, 514b, select units 415a, and 415b and a shunt circuit unit 516.

The bus signal from the master device 501 is transmitted to the bus signal buffer 514a via the bus signal receiving unit 405. The bus signal of the master device 502 is transmitted to the bus signal buffer 514a via the bus receiving unit 507. The bus signal of the master device 503 is transmitted to the bus signal buffer 514b via the bus receiving unit 509. The bus signal of the master device 504 is transmitted to the bus signal buffer 514b via the bus receiving unit 511. After storing the bus signals from the master devices, the bus signal buffer 514a respectively transmits them to the select unit 515a. After storing the bus signals from the master devices, the bus signal buffer 514b respectively transmits them to the select unit 515b. The bus sequencing control unit 513 controls the select unit 415a, 515b to select one of the bus signals from the master devices and transmit it to the slave device 517 according to the principles mentioned in the first embodiment.

The bus response signals from the slave device 517 are transmitted to and shunted by the signal shunt circuit unit 516 which may be realized by a digital logic circuit or selector chip. The shunted bus response signals are transmitted to the master devices 501-504 respectively via the corresponding bus signal transmission units 506, 508, 510 and 512. The master device, which its transmitted signal was selected, identifies the bus response signals and receives the bus response signal.

Figure 6:
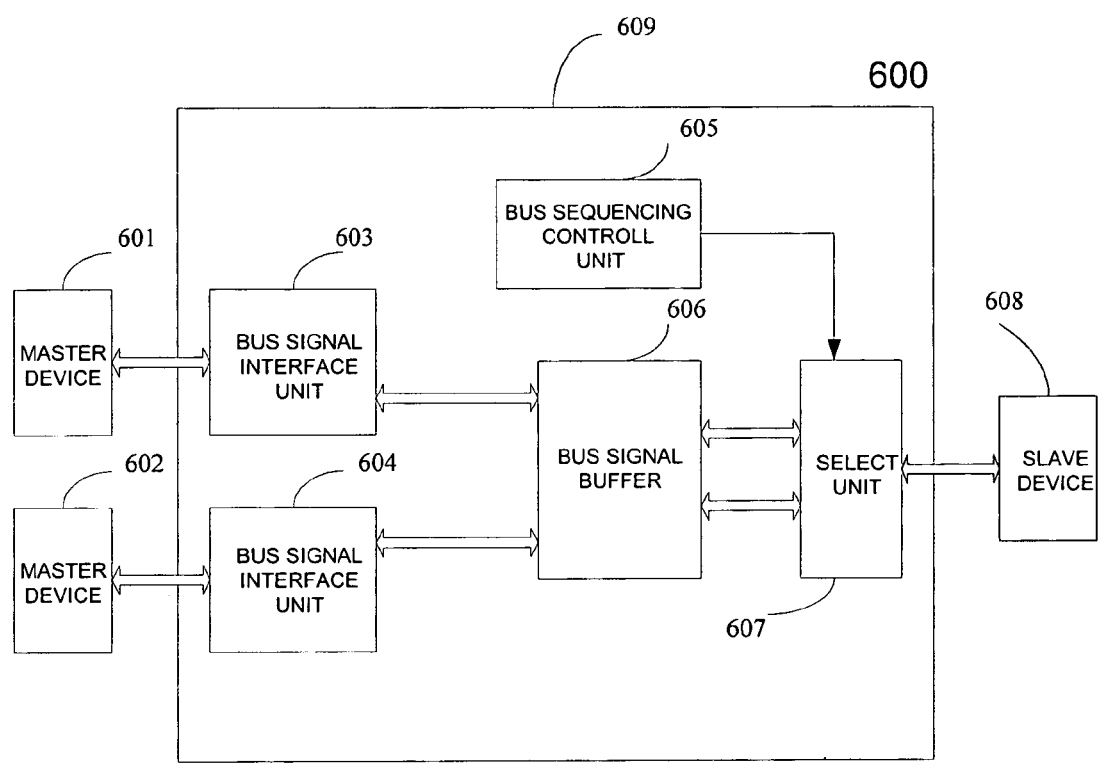
FIG. 6 is a third embodiment of the system according to the present invention.

Referring now to FIG. 6, there shows a function block diagram 600 of a bus controller in accordance with one embodiment of the present invention. The system 600 as shown in FIG. 6 includes two master devices 601-602, a bus controller 609, a slave device 608. The bus controller 609 includes two bus signal interface units 603-604, a bus signal buffer 606, a bus sequencing control unit 605 and a select unit 607.

When the master devices 601 and 602 require to access the slave device 608, the bus signals from the master devices 601 and 602 are transmitted to the bus signal buffer 606 via the bus signal interface units 603 and 604 at one time, respectively. After storing the two groups of the bus signals respectively from the master devices 601 and 602, the bus signal buffer 606 transmits the bus signals to the select unit 607, at this time, the bus sequencing control unit 605 will select one bus signal according to a presetting principle, for example, the bus signal of the master device 601, and transmit it to the slave device 608. The bus response signal of the slave device 608 enters into the select unit 607 for being shunted. After shunted into two ways by the select unit 607, the bus response signal enters into the bus signal buffers 606 for storing. After storing, the bus response signal will be transmitted to the master devices 601-602 respectively via the bus signal interface units 603-604. The master device, which its transmitted signal was selected, identifies the bus response signals and receives the bus response signal.

Figure 7:
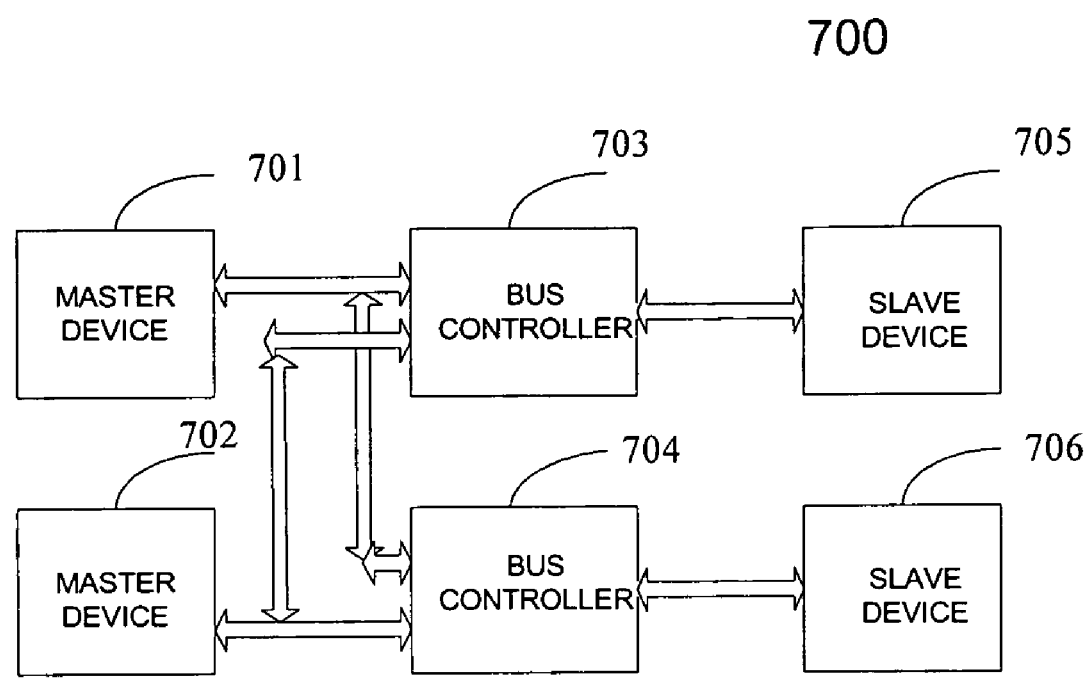
FIG. 7 is a fourth embodiment of the system according to the present invention.

FIG. 7 shows still another embodiment 700 according to the present invention. The system 700 includes two master devices 701-702, two corresponding bus controller 703-704 and two slave devices 705-706. Each bus controller connects to at least one of the slave devices 705, 706, and all master devices 701-702. When the bus controllers want to receive the bus signals from the master devices, each bus control device will determine if the bus signal is transmitted to the slave device which is connected thereto. If so, the bus controller will communicate with the slave device connected thereto. For example, the master device 701 sends an accessing request to the slave device 706, the bus controller 703 determines that the accessing request is not for the slave device 705 and has no action, while the bus controller 704 determine that the accessing request is for the slave device 706 and forward the request to the slave 706, hence the master device 701 realizes the communication with the slave device 706.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A system comprising:
a plurality of master devices;
a slave device;
a bus controller coupled between the master devices and the slave device, the bus controller including:
a plurality of bus signal receiving units, each corresponding to one of the master devices;
a plurality of bus signal transmission units, each corresponding to one of the master devices;
a bus sequencing control unit, a bus signal buffer, a select unit and a shunt circuit unit, wherein the bus signals from the master devices are transmitted to the bus signal buffer via corresponding bus signal receiving units, after storing the bus signals from the master devices, the bus signal buffer respectively transmits the bus signals to the select unit, the bus sequencing control unit controls the select unit to select the bus signal from one master device and transmit it to the slave device, the bus response signals from the slave device is transmitted to and shunted by the signal shunt circuit unit, and the shunted bus response signals are transmitted to all master devices respectively via the corresponding bus signal transmission units,
wherein the bus controller is configured to receive bus signals from the master devices, select one of the bus signals from one of the master devices and forwards the selected bus signal to the slave device, after the slave device receives the bus signal from the one of the master devices, the slave device sends a bus response signal to the master devices over the bus controller, and the master device from which the bus signal is selected identifies and receives the bus response signal.

2. The system as claimed in claim 1, wherein the bus controller is designed to select one of the bus signals based on one of: signal first-in first-out, signal last-in first-out, or presetting signal output sequencing.

3. The system as claimed in claim 1, wherein each of the bus signals from the master devices includes identification information, so that the slave device adds similar corresponding identification information into the bus response signal, each of the master devices identifies whether the bus response signal is sent thereto according the similar corresponding identification information.

4. The system as claimed in claim 1, wherein the bus signal from each of the master devices include a control bus signal, an address bus signal and data bus signal.

5. The system as claimed in claim 1, wherein the bus controller includes a plurality of bus signal interface units, each corresponding to one master device, a bus signal buffer, a bus sequencing control unit and a select unit, and wherein:
the bus signals from the master devices are transmitted to the bus signal buffer via the corresponding bus signal interface units, respectively;
the bus signal buffer stores the bus signals from the master devices and forwards the bus signals to the select unit;
the bus sequencing control unit controls the select unit to select the bus signal of one master device and transmit it to the slave device;
the bus response signal of the slave device enters into the select unit for being shunted, the shunted bus response signal is transmitted to all master devices.

6. The system as claimed in claim 5, wherein the bus sequencing control unit is controlled by a CPU or a single-chip microcomputer.

7. The system as claimed in claim 1, wherein before the bus controller receives the bus signals from the master devices, the bus control device determines if one of the bus signal is transmitted to the slave device which is connected to the bus controller, If so, the bus controller will communicate with the slave device connected thereto.

8. A system comprising:

a plurality of slave devices that are not interconnected to each other;

a plurality of master devices, each of the master devices accessing one of the slave devices simultaneously or respectively at least a bus controller, coupled between the master devices and the slave devices, designed to manage that only one of the master devices can communicate with one of the slave devices at one time over a data bus regardless when and how the bus signals are coming from the master devices, wherein the bus controller includes a select unit and a bus signal buffer, the select unit is configured to determine which one of the bus signals shall be transported to a slave device being one of the slave devices for a response only if when more than one of the bus signals are received at the same time, the bus signal buffer is provided to buffer the bus signals that are not selected for communication with the slave device, and wherein, after the slave device receives a selected bus signal from a master device being one of the master devices, the slave device sends a bus response signal to the master devices via the bus controller, the bus response signal including an identifier of the slave device, and one of the master devices from which the bus signal is selected identifies and acknowledges the bus response signal.

9. The system as claimed in claim 8, wherein, after the selected bus has been responded to by the slave device, one of the bus signals that are not selected and buffered in the bus signal buffer is sent to the slave device for a response in accordance to certain criteria.

10. The system as claimed in claim 9, wherein the certain criteria pertains to one of: signal first-in first-out, signal last-in first-out, or presetting signal output sequencing.

11. The system as claimed in claim 9, wherein each of the bus signals includes an identifier identifying one of the master devices, a response provided by the slave device in responding to the each of the bus signals includes similar identification information in accordance with the identifier such that the one of the master devices can acknowledge that the response from the slave device is for the one of the master devices although all of the master devices receives the response.

* * * * *